United States Patent [19]

Sayed et al.

[11] Patent Number: 5,605,945
[45] Date of Patent: Feb. 25, 1997

[54] POLYAMIDE COMPOUNDS CONTAINING DIEPOXIDE AND HAVING HIGH VISCOSITY

[75] Inventors: Aziz E. Sayed, Leverkusen; Edgar Ostlinning, Düsseldorf; Karsten-Josef Idel, Krefeld; Hubert Goldbach, Ratingen; Dieter Löhr, Uedem; Ralf Lange, Krefeld, all of Germany

[73] Assignee: Bayer Aktiengesellschaft, Leverkusen, Germany

[21] Appl. No.: 445,886

[22] Filed: May 22, 1995

[30] Foreign Application Priority Data

Jun. 3, 1994 [DE] Germany ............... 44 19 592.3

[51] Int. Cl.$^6$ ............... C08L 63/00; C08L 77/00
[52] U.S. Cl. ............... 523/440; 523/400; 525/423
[58] Field of Search ............... 525/423; 523/400, 523/440

[56] References Cited

U.S. PATENT DOCUMENTS 3,458,481  7/1969  Reichold et al. ............... 525/423
4,673,723  1/1987  Cuzin ............... 528/113
4,845,168  7/1989  Dykes et al. ............... 525/423
5,177,144  1/1993  Torre et al. ............... 525/65
5,296,556  3/1994  Frihart ............... 525/420.5

FOREIGN PATENT DOCUMENTS 315408   5/1989   European Pat. Off. .
0482483  4/1992   European Pat. Off. .
830823   12/1956  United Kingdom ............... 525/423
1032983  4/1964   United Kingdom ............... 525/423

OTHER PUBLICATIONS

Chem. Abstracts 109:74149w (1988).
Chem. Abstracts 87:202733y (1977).

*Primary Examiner*—Ana Woodward
*Attorney, Agent, or Firm*—Connolly and Hutz

[57] ABSTRACT

The invention relates to polyamide molding compounds with increased viscosity, high thermal stability and favorable mechanical properties, to a process for their production and to their use.

2 Claims, No Drawings

POLYAMIDE COMPOUNDS CONTAINING DIEPOXIDE AND HAVING HIGH VISCOSITY

This invention relates to polyamide molding compounds with increased viscosity, high thermal stability and favorable mechanical properties, to a process for their production and to their use.

Polyamide molding compounds are high-quality thermoplastics which are distinguished by high heat resistance, very good mechanical properties, high toughness values, high resistance to chemicals and easy processability. The properties of polyamides can be significantly broadened by reinforcement with glass fibers, glass beads, mineral fillers and mixtures thereof. Modification with elastomers improves the impact strength of polyamides. The large number of possible combinations enables new products tailored to special applications to be developed.

The range of applications of polyamides includes fibers, films, hotmelt adhesives and moldings for the electrical, building, furniture and automotive industries. Reinforced polyamides are among the high-quality engineering products which have replaced metals in various applications.

As partly crystalline polymers with a very high percentage of hydrogen bonds, the polyamides have very low melt viscosities. Polyamides with a relative viscosity of 3 (as measured in 1% metacresol solution at 25° C.) have been very successfully used for the production of injection-molded articles. Polyamides with increased viscosities are used for the extrusion of films, profiles or pipes. Depending on the particular application, viscosities of 4 to 6 (as measured in 1% metacresol solution at 25° C.) are sufficient to obtain extrudates with adequate melt stabilities.

The viscosity of polyamides is generally increased by:
1. Solid-phase post-condensation
(e.g. DD 248 130)

In this process, polyamide granules with relatively low viscosities are heated at elevated temperatures (below the melting point) in continuous or discontinuous inert gas dryers until the required viscosities are reached (20 to 60 hours). However, a sufficient concentration of active COOH and $NH_2$ groups must be present to initiate the solid-phase post-condensation reaction.

2. Branched polyamides
(e.g. JP 52 032 944)

By adding small quantities of tricarboxylic acids or triamines, branched polyamides with relatively high viscosities can be obtained in the production of the polyamides.

3. Catalytic additives
(e.g. EP 315 408)

By adding catalytic quantities of orthophosphoric acid or phosphorous acids, the post-condensation time-can be significantly reduced in the case of dry polyamides. In the presence of small quantities of moisture, there is a distinct reduction in molecular weight.

When glass fibers are compounds (mixed) with polyamides having relatively high viscosities, there is a drastic reduction in their viscosity values.

The following processes are used for the production of glass-fiber-reinforced polyamide compounds with increased viscosities:

1) the polyamide compound (containing glass fibers and additives) is produced first, after which the granules are post-condensed in the solid phase in an inert gas dryer;
2) for the production of the compound, a mixture of polyamide (normal viscosity) and a polymer containing reactive functional groups is used instead of pure polyamide. Suitable polymers are homopolymers or copolymers of ethylene which contain maleic anhydride, carboxylic acids or t-butyl acrylates as reactive groups. During compounding, the amide groups react with the anhydride or acrylate groups and thus increase the molecular weight of the compound.

The properties of the pure polyamide are thus replaced by the properties of the polymer blend.

The problem addressed by the present invention was to provide glass-fiber-reinforced polyamide compounds with increased viscosities and favorable thermal and mechanical properties during compounding.

The present invention relates to a mixture of

A) 79 to 47% by weight of a thermoplastic partly crystalline polyamide

B) 0 to 50% by weight of reinforcing materials,

C) 0.1 to 4% by weight of a diepoxide,

D) 0.1 to 2% by weight of processing additives.

Not only do these polyamide compounds reach the required viscosity during compounding, they can also be processed very effectively by injection molding, gas injection and extrusion and extrusion blow molding by virtue of their broad processing window and the thermal stability of the melt. The stability of the melt and the very good weldability of extruded or injection-molded parts by the hot element, heat sealing, vibration or high-frequency process are surprising. The broad welding window of the claimed products is also surprising.

The compounds according to the invention are produced in single-screw or twin-screw extruders or kneaders. The melt temperature is determined by the polyamides used and is between 220° C. and 300° C.

Suitable thermoplastic polyamides A) for the molding compounds according to the invention are partly crystalline polyamides (PA), preferably polyamide 6, polyamide 66, polyamide 46, polyamide 610, polyamide 6/6T, or partly crystalline copolyamides and mixtures based on these components.

Suitable reinforcing materials B) for the molding compounds according to the invention are commercially available glass fibers, carbon fibers, mineral fibers, surface-treated fillers, etc. for polyamides which may be used either individually or in the form of mixtures.

The diepoxide C) used for the molding compounds according to the invention is selected from commercial diepoxides based on diglycidyl ethers (bisphenol A and epichlorohydrin), on amine epoxy resins (aniline and epichlorohydrin), on diglycidyl esters (cycloaliphatic dicarboxylic acids and epichlorohydrin), used individually or in the form of mixtures, and preferably from diepoxides based on 2,2-bis-[p-hydroxyphenyl]-propane diglycidyl ether, bis-[p-(N-methyl-N-2,3-epoxypropyl- amino)-phenyl]-methane.

The processing additives D) consist of commercially available lubricants, heat stabilizers, nucleating agents and colorants (pigments or dyes).

EXAMPLES

The following products were used in the Examples:

PA 6=Durethan® B 31 F., a product of Bayer AG (rel. viscosity 3, as measured in 1% metacresol solution at 25° C.)

PA 66=Durethan® A 30, a product of Bayer AG (rel. viscosity 3, as measured in 1% metacresol solution at 25° C.)

Diepoxide=Lekutherm® X 18, X20, products of Bayer AG Amide wax (a product of Abrilwax) Bayer CS 7919 glass fibers Nucleating agent=microtalcum Heat stabilizer=CuI/alkali metal halides Carbon black Examples 1 to 3

The starting materials were mixed and extruded at 260° C. in a twin-screw extruder (ZSK). The granules obtained were dried for 4 hours at 70° C. in a vacuum drying cabinet. The relative viscosity of the granules and their melt viscosity at 290° C. /5 kg were determined (Table 1).

TABLE 1

Change in the relative viscosity and melt viscosity of PA 6 in dependence upon the Lekutherm X 18 content

| Example No. | | Comp. 1 | Ex. 1 | Ex. 2 | Ex 3 |
|---|---|---|---|---|---|
| PA 6 | % | 100 | 99.8 | 99.7 | 99.6 |
| Lekutherm X 18 | % | None | 0.2 | 0.3 | 0.4 |
| Rotational speed | r.p.m. | 100 | 1200 | 100 | 100 |
| Temperature adjusted | °C. | 260 | 260 | 260 | 1260 |
| Melt temperature | °C. | 265 | 267 | 268 | 1267 |
| Energy absorption | Nm | 23 | 26 | 36 | 44 |
| Rel. viscosity | | 2.97 | 3.35 | 3.61 | 3.86 |
| Melt volume index 290° C./5 kg | ccm/ 10 mins. | 159 | 74 | 38 | 25 |
| Isotherm. crystallization time at 200° C. | Mins. | 3.8 | 5.0 | 5.4 | 5.5 |

Examples 4 to 7

The starting materials were mixed and extruded in a twin-screw extruder (ZSK) at 260° C. to 290° C. The Lekutherm X 18 was introduced into the PA melt by a liquid metering pump. The granules obtained were dried for 4 hours at 70° C. in a vacuum drying cabinet. The ash content of the granules, their relative viscosity and their melt viscosity at 270° C./5 kg were determined (Table 2).

There was found to be a linear relation between the diepoxide content and the melt viscosity.

TABLE 2

Change in the relative viscosity of glass-fiber-reinforced PA 6 in dependence upon the Lekutherm X 18 content

| Example No. | | Comp. 2 | Ex. 4 | Ex. 5 | Ex. 6 | Ex. 7 |
|---|---|---|---|---|---|---|
| PA 6 | % | 69.6 | 69.4 | 69.3 | 69.2 | 69.1 |
| Glass fibers | % | 30.0 | 30.0 | 30.0 | 30.0 | 30.0 |
| Carbon black | % | 0.2 | 0.2 | 0.2 | 0.2 | 0.2 |
| Heat stabilizer | % | 0.2 | 0.2 | 0.2 | 0.2 | 0.2 |
| Lekutherm X 18 | % | None | 0.2 | 0.3 | 0.4 | 0.5 |
| Ash content | % | 29.9 | 30.0 | 29.6 | 29.3 | 30.2 |
| Rel. viscosity | | 2.85 | 3.32 | 3.50 | 3.72 | 3.93 |
| Melt volume index 270° C./5 kg | cm³/ 10 mins. | 14.4 | 12.0 | 8.80 | 6.52 | 3.52 |

Examples 8 to 9

The starting materials were mixed and extruded at 290° C. The granules obtained were dried for 4 hours at 70° C. in a vacuum drying cabinet and then processed to test specimens in an Arburg injection molding machine at a temperature of 290° C. The mechanical properties and weld line strengths were determined (Table 2).

TABLE 3

Mechanical properties of compounds of glass-fiber-reinforced PA 6 with diepoxides

| Example No. | | Comp. Ex. 3 | Ex. 8 | Comp. Ex. 4 | Ex. 9 |
|---|---|---|---|---|---|
| PA 6 | % | 69.4 | 69.0 | 59.4 | 59.0 |
| Glass fibers | % | 30.0 | 30.0 | 40.0 | 40.0 |
| Carbon black | % | 0.2 | 0.2 | 0.2 | 0.2 |
| Heat stabilizer | % | 0.2 | 0.2 | 0.2 | 0.2 |
| Lubricant | % | 0.2 | 0.2 | 0.2 | 0.2 |
| Lekutherm X 18 | % | None | 0.4 | None | 0.4 |
| Rel. Viscosity | | 2.85 | 3.84 | 2.84 | 3.84 |
| Melt volume index 270° C./5 kg | ccm/ 10 mins. | 18.72 | 6.23 | 10.65 | 1.68 |
| Izod impact strength | kJ/mm² | 65 | 66 | 67 | 70 |
| Tensile strength | N/mm² | 166 | 170 | 200 | 195 |
| Breaking elongation | % | 3.5 | 3.5 | 2.1 | 2.8 |
| E Modulus in tension | N/mm² | 9800 | 10100 | 11800 | 13190 |
| Flexural strength | N/mm² | 269 | 262 | 307 | 247 |
| Outer fiber strength | % | 4.4 | 4.4 | 3.6 | 2.3 |
| E modulus in flexure | N/mm² | 9050 | 8560 | 11000 | 11500 |
| Flow line strength | N/mm² | 88 | 92 | 86 | 88 |
| Weld line strength | N/mm² | 90 | 95 | — | — |
| Melt volume index 270° C./5 kg | | | | | |
| After 5 mins. | cm³/ 10 mins. | 18.72 | 6.23 | 10.65 | 1.68 |
| After 10 mins. | cm³/ 10 mins. | 18.90 | 7.18 | 11.08 | 1.75 |
| After 15 mins. | cm³/ 10 mins. | 20.80 | 8.38 | 10.33 | 1.82 |
| After 20 mins. | cm³/ 10 mins. | 18.40 | 8.70 | 9.65 | 1.95 |

Example 10

The starting materials were mixed and extruded at 290° C. The granules obtained were dried for 4 hours at 70° C. in a vacuum drying cabinet and then processed to test specimens in an Arburg injection molding machine at a melt temperature of 290° C. The mechanical properties and weld line strength were determined (Table 4).

TABLE 4

| | | Example 5 | Example 10 |
|---|---|---|---|
| PA 66 | % | 69.5 | 69.1 |
| Glass fibers | % | 30.0 | 30.0 |
| Carbon black | % | 0.1 | 0.1 |
| Heat stabilizer | % | 0.2 | 0.2 |
| Lubricant | % | 0.2 | 0.2 |
| Lekutherm X 18 | % | None | 0.4 |
| Rel. viscosity | | 2.85 | 4.10 |
| Izod impact strength | kJ/m² | 60 | 68 |
| Tensile strength | N/mm² | 180 | 178 |
| Breaking elongation | % | 3.4 | 3.6 |
| E Modulus in tension | N/mm² | 9400 | 9800 |
| Flexural strength | N/mm² | 290 | 273 |
| Outer fiber strain | % | 4.3 | 4.4 |
| E Modulus in Flexure | N/mm² | 8300 | 8450 |

Example 11

Bowls of an intake manifold were injection molded from Comparison 2, Example and Comparison 5, welded together by the vibration method and then measured for bursting pressure. The intake manifold was cut into segments in order to determine weld line strength. The results obtained are set out in Table 5

TABLE 5

Bursting pressure and weld line strength of vibration-welded intake manifolds

|  | Comparison 2 PA 6 + 30% GF | Comparison 5 PA 66 + 30% GF | Example 8 |
|---|---|---|---|
| Bursting pressure (bar) | 6.68 | 4.45 | 7.75 |
| Weld line strength (N) | 630 | 460 | 791 |

We claim:
1. Polyamide molding compounds consisting of:
  A. from 79 to 47% by weight of thermoplastic, partly crystalline polyamide;
  B. from 0 to 50% by weight of reinforcing materials;
  C. from 0.1 to 4% by weight of a diepoxide based on bisphenol and epichlorohydrin, or based on cycloaliphatic dicarboxylic acids and epichlorohydrin, or a mixture thereof; and
  D. from 0.1 to 2% by weight of processing additives selected from the group consisting of lubricants, heat stabilizers, nucleating agents, and colorants.
2. The molding compound of claim 1, wherein the diepoxide is based on bisphenol A and epichlorohydrin.

* * * * *